(12) United States Patent
Baker et al.

(10) Patent No.: US 10,257,814 B2
(45) Date of Patent: Apr. 9, 2019

(54) ADDRESSING AVAILABLE RESOURCES FOR HSDPA ACCESSES

(75) Inventors: Matthew P. J. Baker, Canterbury (GB); Timothy J. Moulsley, Caterham (GB)

(73) Assignee: KONINKLIJKE PHILIPS ELECTRONICS N.V., Eindhoven (NL)

(*) Notice: Subject to any disclaimer, the term of this patent is extended or adjusted under 35 U.S.C. 154(b) by 837 days.

(21) Appl. No.: 12/518,300

(22) PCT Filed: Dec. 6, 2007

(86) PCT No.: PCT/EP2007/063392
§ 371 (c)(1),
(2), (4) Date: Jun. 9, 2009

(87) PCT Pub. No.: WO2008/071614
PCT Pub. Date: Jun. 19, 2008

(65) Prior Publication Data
US 2010/0298018 A1 Nov. 25, 2010

(30) Foreign Application Priority Data

Dec. 14, 2006 (EP) .................................. 06301258
Jan. 15, 2007 (EP) .................................. 07300730

(51) Int. Cl.
*H04L 1/00* (2006.01)
*H04L 1/18* (2006.01)
(Continued)

(52) U.S. Cl.
CPC ......... *H04W 72/042* (2013.01); *H04L 1/0028* (2013.01); *H04L 1/0031* (2013.01);
(Continued)

(58) Field of Classification Search
CPC ........ H04B 1/707; H04B 1/69; H04B 7/2628; H04B 2201/70701; H04B 1/7143;
(Continued)

(56) References Cited

U.S. PATENT DOCUMENTS 6,041,034 A * 3/2000 Fukumasa et al. ............ 370/203
6,163,524 A * 12/2000 Magnusson et al. .......... 370/208
(Continued)

FOREIGN PATENT DOCUMENTS

| EP | 1414202 A1 | 4/2004 |
|---|---|---|
| EP | 1427245 A2 | 6/2004 |

(Continued)

OTHER PUBLICATIONS

"Universal Mobile Telecommunications System (UMTS); Multiplexing and Channel Coding (FDD) (3GPP TS 25.212 Version 7.3.0 Release 7); ETSI TS 125 212", ETSI Standards, LIS, vol. 3-R1, No. V7.3.0, Dec. 1, 2006, XP014036328.

*Primary Examiner* — Yuwen Pan
*Assistant Examiner* — Paul P Tran

(57) ABSTRACT

A method of indicating to a secondary station a set of at least one available transmission resource among a predetermined plurality of transmission resources, each set being described by a plurality of parameters, said method comprising the steps of: —signalling to the secondary station an association between a control signalling channel and at least one parameter describing a set of transmission resources; coding into an address at least one remaining parameter from the plurality of parameters describing the said set of transmission resources; —transmitting the address to the secondary station using the said control signalling channel.

44 Claims, 5 Drawing Sheets

(51) Int. Cl.
*H04W 72/04* (2009.01)
*H04W 8/26* (2009.01)

(52) U.S. Cl.
CPC .......... *H04L 1/0083* (2013.01); *H04L 1/1887* (2013.01); *H04W 8/26* (2013.01); *H04W 72/044* (2013.01)

(58) Field of Classification Search
CPC ..... H04B 7/2634; H04B 7/2653; H04J 13/00; H04J 13/10; H04J 13/0022; H04J 13/0048; H04J 13/18; H04J 13/004; H04J 13/0044; H04J 13/0077; H04J 13/12; H04J 13/16; H04J 13/20; H04J 1/16; H04L 1/1809; H04L 1/1812; H04L 1/1887; H04L 5/0007; H04L 47/10; H04L 47/2441; H04L 47/30; H04L 1/0027; H04L 1/0028; H04L 1/1825; H04L 5/0092; H04L 1/0031; H04L 1/0083; H04L 1/1896; H04W 16/10; H04W 24/00; H04W 28/04; H04W 28/26; H04W 72/0466; H04W 36/30; H04W 36/18; H04W 36/0011; H04W 72/04; H04W 76/02; H04W 80/04; H04W 84/08; H04W 88/26; H04W 72/042; H04W 72/044; H04W 88/06; H04W 88/08
USPC ......... 455/62, 436, 437, 446, 447, 450, 451, 455/452, 453, 509, 522, 403, 452.2, 455/562.1; 370/209, 235, 252, 328, 239, 370/332, 335, 342, 469, 474, 208, 203, 370/331, 337, 338, 343, 347; 375/130, 375/260, 140, 146; 714/748, 751
See application file for complete search history.

(56) References Cited

U.S. PATENT DOCUMENTS

| | | | | |
|---|---|---|---|---|
| 6,646,979 | B1 * | 11/2003 | Chen et al. | 370/208 |
| 6,807,192 | B2 * | 10/2004 | Terry | 370/469 |
| 7,039,092 | B1 * | 5/2006 | Cao et al. | 375/140 |
| 7,289,452 | B2 * | 10/2007 | Malkamaki | 370/252 |
| 7,379,489 | B2 * | 5/2008 | Zuniga et al. | 375/130 |
| 7,508,804 | B2 * | 3/2009 | Das et al. | 370/342 |
| 7,636,328 | B2 * | 12/2009 | Teague et al. | 370/277 |
| 2002/0146059 | A1 * | 10/2002 | Kodani et al. | 375/130 |
| 2002/0160744 | A1 * | 10/2002 | Choi | H04B 7/2628 455/403 |
| 2003/0035403 | A1 * | 2/2003 | Choi | H04L 1/1887 370/342 |
| 2003/0076783 | A1 * | 4/2003 | Das et al. | 370/236 |
| 2003/0108025 | A1 * | 6/2003 | Kim et al. | 370/342 |
| 2003/0189918 | A1 * | 10/2003 | Das | H04W 48/12 370/349 |
| 2005/0047344 | A1 * | 3/2005 | Seol | 370/235 |
| 2005/0250497 | A1 * | 11/2005 | Ghosh et al. | 455/436 |
| 2006/0291403 | A1 * | 12/2006 | Kahtava | H04L 1/0083 370/252 |
| 2008/0291820 | A1 * | 11/2008 | Lim | H04J 13/18 370/209 |
| 2009/0149187 | A1 * | 6/2009 | Miki et al. | 455/450 |
| 2009/0168683 | A1 * | 7/2009 | Franceschini | H04W 72/14 370/312 |
| 2009/0262655 | A1 * | 10/2009 | Harada | H04L 1/1825 370/252 |

FOREIGN PATENT DOCUMENTS

| | | | |
|---|---|---|---|
| JP | 2003143108 A | 5/2003 | |
| JP | 2003318781 A | 11/2003 | |
| WO | WO 2007059791 A1 * | 5/2007 | ............ H04W 72/14 |

\* cited by examiner

|   |   | Dynamic part of starting code offset (added to the preconfigured offset) | | | | | | | | | | | | | | |
|---|---|---|---|---|---|---|---|---|---|---|---|---|---|---|---|---|
|   |   | 0 | 1 | 2 | 3 | 4 | 5 | 6 | 7 | 8 | 9 | 10 | 11 | 12 | 13 | 14 |
| Number of codes | 1 | ▓ | ▓ | ▓ | ▓ | ▓ | ▓ | ▓ | | | | | | | | |
| | 2 | ▓ | ▓ | ▓ | ▓ | ▓ | ▓ | ▓ | | | | | | | | |
| | 3 | | ▓ | ▓ | ▓ | ▓ | ▓ | ▓ | | | | | | | | |
| | 4 | | ▓ | ▓ | ▓ | ▓ | ▓ | ▓ | | | | | | | | |
| | 5 | | ▓ | ▓ | ▓ | ▓ | ▓ | ▓ | | | | | | | | |
| | 6 | | | | | | | | | | | | | | | |
| | 7 | | | | | | | | | | | | | | | |
| | 8 | | | | | | | | | | | | | | | |
| | 9 | | | | | | | | | | | | | | | |
| | 10 | | | | | | | | | | | | | | | |
| | 11 | | | | | | | | | | | | | | | |
| | 12 | | | | | | | | | | | | | | | |
| | 13 | | | | | | | | | | | | | | | |
| | 14 | | | | | | | | | | | | | | | |
| | 15 | | | | | | | | | | | | | | | |

FIG. 5

ADDRESSING AVAILABLE RESOURCES FOR HSDPA ACCESSES

FIELD OF THE INVENTION

This invention relates to a method for addressing available transmission resources, and to a base station and a mobile station adapted to this method.

BACKGROUND OF THE INVENTION

In UMTS, the allocation of the available transmission resources for HSDPA accesses, which in this case are codes, is typically operated to a plurality of terminals. These available resources are listed within a list consisting of 15 available codes. According to the UMTS specifications, it is required that each set of codes is in a single contiguous block, meaning that the code numbers for a single terminal are consecutive. Then, for signalling these sets of available resources, it is only required to have two parameters, namely, a starting point in the list, and a number of codes allocated to this terminal.

Currently, the UMTS specification for HSDPA in FDD mode describes signalling using 7 bits for the CCS (Channelization Code Set), as well as other parameters. For the case where the list of available resources comprises up to 15 codes, this allows all of the 120 possible configurations of starting code and number of codes to be indicated.

These 120 possibilities are illustrated in FIG. 1, where for each row representing an allocated number of codes, each darkened cell represents one possible value for the starting point.

Then, each mobile terminal using HSDPA is required to monitor up to four control channels (HS-SCCH) in case one of them carries control information intended for that terminal.

In practice, less than the maximum possible number of codes may have been allocated by the network for HSDPA data transmission. However, the current HS-SCCH signalling can address the whole code space.

However, the amount of signalling overhead for UMTS is potentially significant, and it is required to minimize the number of bits used for the signalling.

SUMMARY OF THE INVENTION

It is then an aim of the present invention to provide a method for dynamically allocating the available transmission resources, using less signalling overhead.

According to a first aspect of the invention, it is proposed a method of indicating to a secondary station a set of at least one available transmission resource among a predetermined plurality of transmission resources, each set being described by a plurality of parameters, said method comprising the steps of:
  signalling to the secondary station an association between a control signalling channel and at least one parameter describing a set of transmission resources;
  coding into an address at least one remaining parameter from the plurality of parameters describing the said set of transmission resources;
  transmitting the address to the secondary station using the said control signalling channel.

According to a second aspect of the invention, it is proposed a primary station, comprising means for allocating available resources according to the method of the first aspect of the invention.

According to a third aspect of the invention, it is proposed a secondary station comprising means for decoding an address for resources allocation as generated in the method of the first aspect of the invention.

BRIEF DESCRIPTION OF THE DRAWINGS

The present invention will be more clearly understood with help of an example, illustrated by drawings where:
FIG. 1, already described, represents the possible configurations to be allocated;
FIG. 4 represents the configuration that can be coded with a third embodiment of the invention.
FIG. 5 represents a configuration that can be utilized for coding according to another implementation.

DETAILED DESCRIPTION

According to a first aspect of the invention, in order to allocate sets of available resources to plurality of terminals, like mobile stations for UMTS, it is required to configure these sets as a semi-static set of the available resources for at least one of the control channels, for instance the HS-SCCHs (High Speed Shared Control Channel). For instance, in the case of the addressing of the HSDPA (High Speed Downlink Packet Access), a plurality of codes, such as spreading codes, are assigned to up to four respective terminals.

By doing this, fewer parameters are required to fully describe the possible configurations. Even if the flexibility of the whole system may be reduced, by not supporting the coding of all possible configurations, this invention permits a reduction in the number of bits used for coding a set of resources.

Reducing the number of signalling bits on the HS-SCCH has the benefit of reducing the proportion of the base station's transmission power that is required for the control signalling overhead. Alternatively, it may be possible to take advantage of the reduced number of signalling bits to increase the coverage area within which the HS-SCCH signalling can be successfully received by the receiving terminals.

In the illustrated example, the system is related to UMTS FDD mode, and where the available resources are spreading codes, but this invention could be applied to other systems, like GSM, WiMax, etc. . . . and the resources may be timeslots, frequency subcarriers, or spatial resource units like antennas or MIMO layers. It could in principle be applied in other systems, including TDD and OFDMA (Orthogonal Frequency Division Multiple Access).

In a first embodiment of the invention, the starting code, i.e. the first available resource of the set of resources allocated, is fixed for each control channel. In such a case, each control channel has its corresponding starting point, these starting points being different between each control channel. Then, the second parameter needs to be signalled dynamically on the HS-SCCH itself. This second parameter may be the number of codes. As a consequence, signalling for up to 15 codes this would require only 4 bits instead of the conventional 7.

Figure 2:
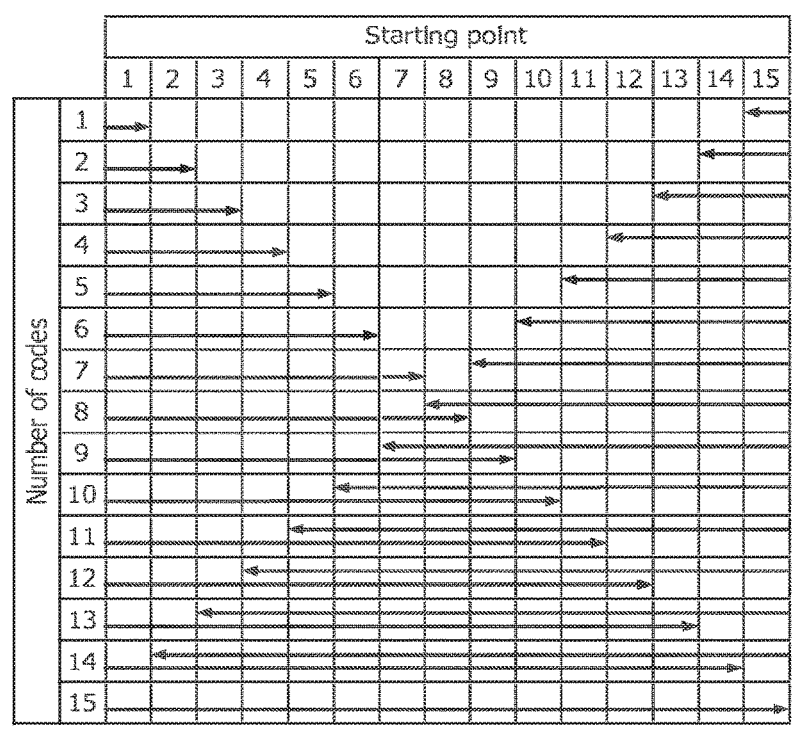
FIG. 2 represents the configurations that can be coded with a first embodiment of the present invention.

FIG. 2 represents an example of this embodiment for two control channels. In this case, two mobile terminals may be simultaneously scheduled to receive HSDPA data in each 2 ms subframe. In the current UMTS specifications, two HS-SCCHs would be used, each carrying 7 bits to indicate the number of channelisation codes and starting code offset. However, according to an embodiment of the invention, two HS-SCCHs would be preconfigured with a defined starting code offset and direction for counting the signalled number of codes. One solution is to preconfigure the first HS-SCCH with a starting code of 1, from which the signalled number of codes is counted upwards, and the second HS-SCCH with a starting code of 15, from which the signalled number of codes is counted downwards. This is illustrated by the arrows, and enables all possible combinations of numbers of codes to be signalled for the two mobile terminals, while requiring only 4 signalling bits per HS-SCCH instead of 7.

However, the flexibility may be reduced since in some scenarios, the whole code space of 15 codes might not be available for HSDPA data transmission (for example if some codes are used for circuit-switched dedicated channels). In such a case, a different starting code could be preconfigured for one or both of the HS-SCCHs, allowing them between them to address the whole of the reduced code space. For example, configuring the first HS-SCCH with a starting code offset of 3 would enable the first two channelisation codes to be used for other types of transmission, while retaining the capability to signal any combination of the remaining code space for two HSDPA users.

In the case of three control channels HS-SCCHs, it is possible that one HS-SCCH is configured with a starting point of 1 and another HS-SCCH is configured with a starting point of 15 (but counting down) as in the preceding example. A third HS-SCCH is preconfigured with a defined starting code and direction of counting in a similar way to the first two HS-SCCHs.

Figure 3:
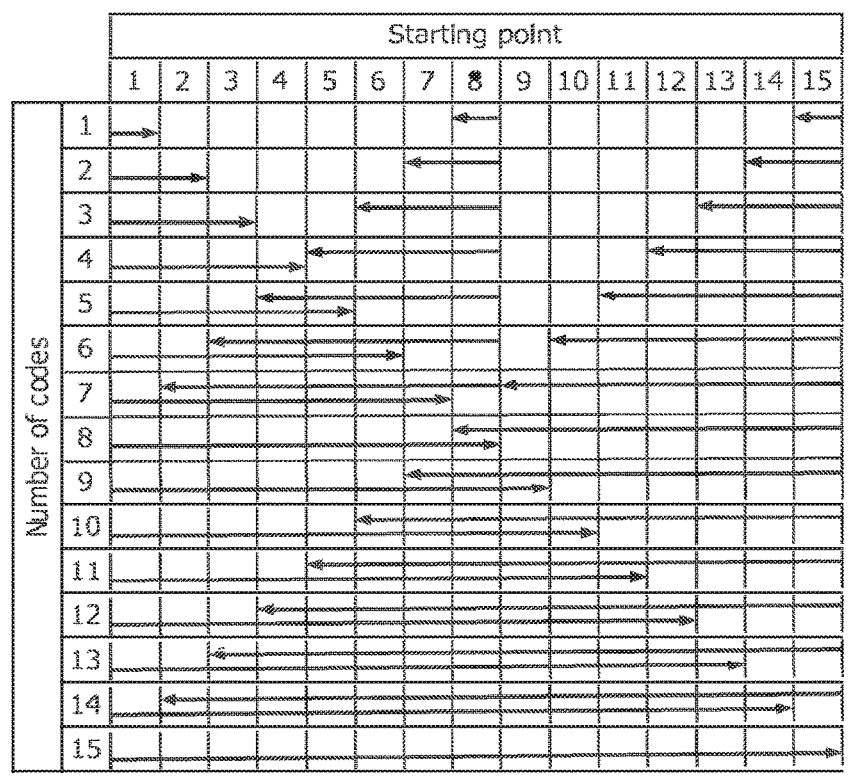
FIG. 3 represents the configurations that can be coded with a second embodiment of the invention.

On FIG. 3, the arrows represent the corresponding configurations that can be obtained by this scheme for each control channels having their corresponding starting point. It can be shown that this enables over 80% of the possible combinations of three sets of codes to be signalled. This small limitation may be acceptable in view of the associated reduction in signalling overhead.

In a variant of to this embodiment, the third HS-SCCH may be preconfigured with a set of starting points, with a small number of possible starting points for instance of 4 starting points (as opposed to only one), from which the exact starting point is signalled dynamically. This would increase the number of signalling bits required above 4, but has the advantage of enabling all possible combinations of three sets of channelisation codes to be signalled.

Figure 4:
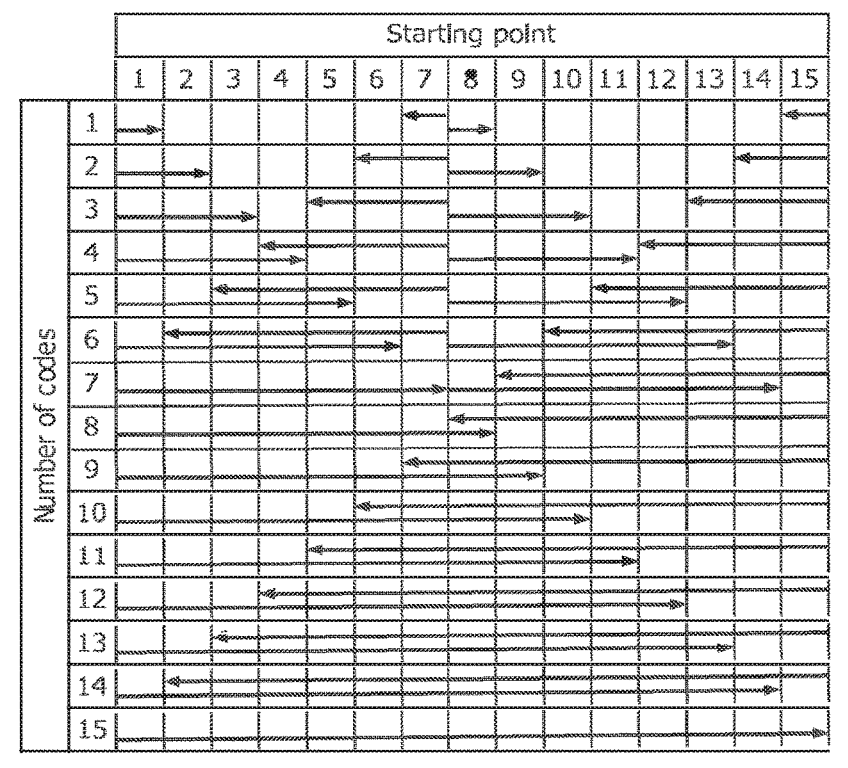

In another example illustrated by FIG. 4, a similar approach can cover a wide range of possible code allocations with four HS-SCCH where each HS-SCCH is configured with a starting point and a direction. As an example, consider the case where the offsets and directions are as follows:

| HS-SCCH | Starting point | Direction |
|---------|----------------|-----------|
| 1 | 1 | Up |
| 2 | 7 | Down |
| 3 | 8 | Up |
| 4 | 15 | Down |

The diagram of FIG. 4 indicates the range of number of codes which would need to be signalled by each HS-SCCH (in different colours). A maximum of 4 bits would be needed to signal the number of codes in each case.

Note that the some of the HS-SCCH's (e.g. those with configured offsets of 7 or 8) would not need as many bits as others to cover all possible options. (e.g. 3 bits to signal the number of codes)

To cover this possibility each HS-SCCH could be configured with an offset, a direction and a maximum number of codes (e.g. 1, 2, 4, 8, or 15 codes, requiring 0, 1, 2, 3, or 4 bits respectively to signal the number of codes).

A similar extension could be used as described above for the case of three HS-SCCHs, to enable all possible combinations of three sets of channelisation codes to be signalled.

According to a variant, the signalling may further comprise a dynamic additional offset of the starting point. For instance, the starting code offset signalled dynamically by the first part of the HS-SCCH is additional to the starting point configured by higher-layer signalling. For example, an HS-SCCH preconfigured by RRC signalling with a starting code offset of 2 could signal starting code offsets for 1 code anywhere between 2 and 2+4=6. This embodiment permits to operate in a similar way as the above mentioned variant with a predetermined set of starting points for each control channel.

This would allow any combination of CCS to be signalled using three HS-SCCHs.

In a variant of these embodiments, it is possible to mix these embodiments together. Indeed, the format of the signalling for each HS-SCCH (i.e. the exact meaning of the signalled bits) could be configured independently for each HS-SCCH.

So in the case of four HS-SCCH, two of the HS-SSCH could be configured with semi-static code offsets and directions as in the example with two HS-SCCH. The signalled information in each HS-SCCH would indicate the number of codes allocated. Two further HS-SCCH could be configured to use the format in the existing specification, where both offset and number of codes are signalled (needing more bits than required by the first two HS-SCCH).

In another variant, a first group of HS-SCCH could be configured with a predetermined starting point, and working dynamically with only a number of codes, and a second group of HS-SCCH with a predetermined starting point, and working dynamically with both a number of codes and an additional offset to the starting point. For instance, in the case of three HS-SCCH, two of them may be configured with a respective static starting point (e.g. 1 and 15) and respective direction in the list (up or down), and controlled with a dynamic number of codes. The third HS-SCCH may be operated with a static starting point on one hand (for instance 2), and on the other hand with a dynamic additional offset and a dynamic number of codes. These dynamic values are restricted to a respective maximal values, for example the maximal additional offset is 6, the maximal number of codes is 5, so that the required number of bits for coding these configurations is only 5.

For the third HS-SCCH, the possible combinations are represented by the table shown in FIG. 5.

The coding of these possible combinations requires only 5 bits, since there are 32 combinations. However, the three HS-SCCH are sufficient to consider all the possible combinations of resource sharing. The coding of the combinations for the third HS-SCCH case can be represented as follows, where the number in each cell is the address of the corresponding combination:

| Number of | Signalled value on HS-SCCH Part 1 | | | | | | |
|---|---|---|---|---|---|---|---|
| codes P | Q = 0 | Q = 1 | Q = 2 | Q = 3 | Q = 4 | Q = 5 | Q = 6 |
| 1 | 0 | 1 | 2 | 3 | 4 | 5 | 6 |
| 2 | 7 | 8 | 9 | 10 | 11 | 12 | 13 |
| 3 | | 14 | 15 | 16 | 17 | 18 | 19 |
| 4 | | 20 | 21 | 22 | 23 | 24 | 25 |
| 5 | | 26 | 27 | 28 | 29 | 30 | 31 |

For example, in operation, the three HS-SCCH are configured according to different mappings: the first and second HS-SCCH are configured with the first mapping, i.e. respective predetermined starting point and directions (e.g. 1, up, and 15, down) and a dynamic number of codes, the third HS-SCCH is configured with a predetermined starting point and a direction (e.g. 2, up), and dynamic additional offset and number of codes. This means that the data to be transmitted to a UE listening to the first or the second HS-SCCH includes only the number of codes coded with 4 bits. The data to be transmitted to a UE listening to the third HS-SCCH includes an additional offset and a number of codes. Examples are summarized in the following table:

| | Scheduled UEs | | | Values signalled on HS-SCCHs | | |
|---|---|---|---|---|---|---|
| | UE "A" | UE "B" | UE "C" | HS-SCCH #1 | HS-SCCH #2 | HS-SCCH #3 |
| Example 1 | 1 code | 7 codes | 7 codes | P = 7 | P = 7 | P = 1, Q = 6 |
| Example 2 | 4 codes | 4 codes | 7 codes | P = 7 | P = 4 | P = 4, Q = 6 |
| Example 3 | 10 codes | 5 codes | Not scheduled | P = 10 | P = 5 | not transmitted |

The saving in overhead would depend on how many users are scheduled simultaneously. For the cases of one or two users, then the first two HS-SCCH (with low overhead) would be used. For more users, the HS-SCCH using the existing format (with no saving in overhead) would be needed. However, on average there would be a saving in the signalling overhead. As the higher-overhead HS-SCCHs would typically require a higher SINR for successful reception, these could be allocated to mobile terminals with high channel quality (as indicated by CQI reports), while the low-overhead HS-SCCHs carrying a smaller number of signalling bits could be allocated to mobile terminals with lower channel quality.

In addition to a particular offset being associated with a given HS-SCCH, the information signalled in the HS-SCCH could specify something about the location of the code resource as well as the number of codes (as is already known from the UMTS specification).

The number of bits for signalling can be further reduced if the amount of resource signalled by each HS-SSCH is ordered. For example, the first HS-SCCH could always have the highest number of codes, the second HS-SCCH the second highest and so on. In the case of 15 codes and two HS-SCCH this would mean that the highest number of codes which would need to be signalled by the second HS-SCCH would be 7.

As mentioned, the number of codes signalled may be combined with an offset, as in the current UMTS specification. In this case it seems possible to signal all possible resource allocations for 15 codes and 4 users by using 4 HS-SSCH with as few as 4 bits for the first two HS-SCCHs and 5 bits for the second two.

An additional possibility is to configure one or more of the HS-SCCH with a semi-static starting code, but for the number of codes to be counted down from the starting code (instead of up). A negative number of codes could be considered as a possibility, which is equivalent to signalling the direction (up or down) within the HS-SCCH.

When counting codes, some embodiments may allow the codes to "wrap around" the end of the code space, thus potentially resulting in two non-contiguous parts of the allocated block of codes.

In a variant of the invention, the dynamically signalled parameter is the starting point, the number of codes being already configured for each control channel.

In the present specification and claims the word "a" or "an" preceding an element does not exclude the presence of a plurality of such elements. Further, the word "comprising" or "comprise" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method of indicating, to a secondary station, a set of at least one transmission resource from among a plurality of transmission resources, said indicated set of at least one transmission resource being described by a plurality of parameters, said method comprising:
   preconfiguring, at the secondary station, at least one association between a control signalling channel selected from among a plurality of control signalling channels, and a value of at least one fixed parameter describing the indicated set of at least one transmission resource;
   coding into an address at least one remaining dynamic parameter from the plurality of parameters describing the indicated set of at least one transmission resource; and
   transmitting the address, to the secondary station, using the selected control signalling channel.

2. The method as claimed in claim 1, wherein the indicated set of at least one transmission resource is of at least one type of the group consisting of: code, timeslot, frequency subcarriers, and spatial resource units.

3. The method as claimed in claim 1, wherein the indicated set of at least one transmission resource is for transmitting data from a primary station to the secondary station.

4. The method as claimed in claim 3, wherein the indicated set of at least one transmission resource is for transmitting data from the secondary station to the primary station.

5. The method as claimed in claim 1, wherein the at least one remaining parameter comprises: an additional offset, wherein said additional offset is one of: a positive value and a negative value.

6. The method as claimed in claim 1, wherein the at least one remaining parameter further comprises a number of transmission resources.

7. The method as claimed in claim 1, wherein the association between the control signalling channel and the at least one parameter is a number of transmission resources.

8. The method as claimed in claim 1, wherein the at least one remaining parameter further comprises an additional number of transmission resources.

9. The method as claimed in claim 8, wherein said additional number is selected from the group consisting of: a positive number and a negative number.

10. The method as claimed in claim 1, wherein said at least one remaining dynamic parameter comprises an indication of a starting point within a list of said plurality of transmission resources.

11. The method as claimed in claim 10, wherein the starting point is derived based on a combination of the at least one fixed parameter and the at least one association between the control signalling channel selected from among the plurality of control signalling channels.

12. The method of claim 10, wherein said at least one remaining dynamic parameter further comprises: an additional offset from said starting point.

13. The method as claimed in claim 1, wherein the preconfiguring, at the secondary station, the at least one association between the control signalling channel selected from among the plurality of control signalling channels, and the value of the at least one fixed parameter describing the indicated set of at least one transmission resource is via Radio Resource Control (RRC) signalling.

14. A primary station, comprising:
at least one communication antenna; and
a computer processing circuit configured to indicate a set of transmission resources from among a plurality of transmission resources including:
signalling to a secondary station, for preconfiguring an association between a control signalling channel selected from among a plurality of control signalling channels, and a value of at least one fixed parameter describing the indicated set of transmission resources;
coding into an address at least one remaining dynamic parameter from a plurality of parameters describing the indicated set of transmission resources; and
transmitting the address to the secondary station using the selected control signalling channel.

15. The primary station as claimed in claim 14, wherein the indicated set of transmission resources is of at least one type of the group consisting of: code, timeslot, frequency subcarriers, and spatial resource units.

16. The primary station as claimed in claim 14, wherein the indicated set of transmission resources is for transmitting data from a primary station to the secondary station.

17. The primary station as claimed in claim 16, wherein the indicated set of transmission resources is for transmitting data from the secondary station to the primary station.

18. The primary station as claimed in claim 14, wherein the at least one remaining parameter comprises: an additional offset, said additional offset is one of: a positive value and a negative value.

19. The primary station as claimed in claim 14, wherein the at least one remaining parameter further comprises a number of transmission resources.

20. The primary station as claimed in claim 14, wherein the association between the control signalling channel and the at least one parameter is a number of transmission resources.

21. The primary station as claimed in claim 14, wherein the at least one remaining parameter further comprises an additional number of transmission resources.

22. The primary station as claimed in claim 21, wherein said additional number is selected from the group consisting of: a positive number and a negative number.

23. The primary station as claimed in claim 14, wherein said at least one remaining dynamic parameter comprises an indication of a starting point within a list of a plurality of transmission resources.

24. The primary station as claimed in claim 23, wherein the computer processing circuit is configured to derive the starting point based on a combination of the at least one fixed parameter and the association between the control signalling channel selected from among the plurality of control signalling channels.

25. The primary station of claim 23, wherein said at least one remaining dynamic parameter further comprises: an additional offset from said starting point.

26. The primary station as claimed in claim 14, wherein the signalling to a secondary station, for preconfiguring the association between the control signalling channel selected from among the plurality of control signalling channels, and the value of the at least one fixed parameter describing the indicated set transmission resources is via Radio Resource Control (RRC) signaling.

27. A secondary station, comprising:
at least one communication antenna; and
a computer processing circuit configured to:
receive, from a primary station, higher layer signalling for preconfiguring an association between a control signalling channel, selected from among a plurality of control signalling channels, and a value of at least one fixed parameter describing a set of transmission resources, and an address; and
decode from the address at least one remaining dynamic parameter from a plurality of parameters describing said set of transmission resources.

28. The secondary station as claimed in claim 27, wherein the set of transmission resources is of at least one type of the group consisting of: code, timeslot, frequency subcarriers, spatial resource units.

29. The secondary station as claimed in claim 27, wherein the set of transmission resources is for transmitting data from a primary station to the secondary station.

30. The secondary station as claimed in claim 29, wherein the set of transmission resources is for transmitting data from the secondary station to the primary station.

31. The secondary station as claimed in claim 27, wherein said at least one remaining dynamic parameter comprises an indication of a starting point within a list of a plurality of transmission resources.

32. The secondary station as claimed in claim 31, wherein the starting point is derived based on a combination of the at least one fixed parameter and the association between the control signalling channel selected from among the plurality of control signalling channels.

33. The secondary station as claimed in claim 27, wherein the higher layer signalling for preconfiguring the association between the control signalling channel, selected from among the plurality of control signalling channels, and the value of the at least one fixed parameter describing the set of transmission resources is Radio Resource Control (RRC) signaling.

34. A communication system comprising:
   at least one primary station comprising:
      a computer processing circuit configured to:
         indicate a set of transmission resources;
         signal to at least one secondary station, for preconfiguring an association between a control signalling channel, selected from among a plurality of control signalling channels, and a value of at least one fixed parameter describing the indicated set of transmission resources;
         code into an address at least one remaining dynamic parameter from a plurality of parameters describing said indicated set of transmission resources; and
         transmitting the address to the secondary station using the selected control signalling channel
   the at least one secondary station comprising:
      a computer processing circuit configured to:
         decode said indicated set of transmission resources.

35. The communication system of claim 34, wherein said preconfigured association is a fixed association.

36. The communication system of claim 34, wherein said association is fixed for a corresponding control channel.

37. The communication system as claimed in claim 34, wherein said at least one remaining dynamic parameter comprises an indication of a starting point within a list of a plurality of transmission resources.

38. The communication system as claimed in claim 37, wherein the computer processing circuit of the primary station is configured to derive the starting point based on a combination of the at least one fixed parameter and the association between the control signalling channel selected from among the plurality of control signalling channels.

39. The communication system of claim 37, wherein said at least one remaining parameter further comprises: an additional offset from said starting point.

40. The communication system of claim 34, wherein the signal to the at least one secondary station, for preconfiguring the association between the control signalling channel, selected from among the plurality of control signalling channels, and the value of the at least one fixed parameter describing the indicated set of transmission resources is a Radio Resource Control (RRC) signal.

41. A method, operable in a primary station for allocating transmission resources, said method comprising:
   preconfiguring a first fixed parameter within a plurality of parameters describing a set of transmission resources selected from a plurality of transmission resources, said first parameter being based on a control channel selected from among a plurality of control channels to be used for communication with a secondary station, wherein the set of transmission resources are used for transmission of user data,
   determining at least one dynamic second parameter from among said plurality of parameters;
   signaling said first parameter to said secondary station; and
   transmitting said at least one dynamic second parameter to said secondary station through said selected control channel.

42. The method as claimed in claim 41, wherein the first parameter and the at least one second parameter are for transmitting data from the primary station to the secondary station.

43. The method as claimed in claim 41, wherein the first parameter and the at least one second parameter are for transmitting data from the secondary station to the primary station.

44. The method as claimed in claim 41, wherein the preconfiguring the first fixed parameter within the plurality of parameters describing the set of transmission resources selected from the plurality of transmission resources, said first parameter being based on the control channel selected from among the plurality of control channels to be used for communication with the secondary station, wherein the set of transmission resources are used for transmission of user data is via Radio Resource Control (RRC) signaling.

* * * * *

(12) INTER PARTES REVIEW CERTIFICATE (3840th)

United States Patent
Baker et al.

(10) Number: US 10,257,814 K1
(45) Certificate Issued: Dec. 23, 2024

(54) ADDRESSING AVAILABLE RESOURCES FOR HSDPA ACCESSES

(75) Inventors: Matthew P. J. Baker; Timothy J. Moulsley

(73) Assignee: KONINKLIJKE PHILIPS N.V.

Trial Number:

IPR2021-00562 filed Feb. 26, 2021

Inter Partes Review Certificate for:

Patent No.: 10,257,814
Issued: Apr. 9, 2019
Appl. No.: 12/518,300
Filed: Jun. 9, 2009

The results of IPR2021-00562 are reflected in this inter partes review certificate under 35 U.S.C. 318(b).

INTER PARTES REVIEW CERTIFICATE
U.S. Patent 10,257,814 K1
Trial No. IPR2021-00562
Certificate Issued Dec. 23, 2024

AS A RESULT OF THE INTER PARTES REVIEW PROCEEDING, IT HAS BEEN DETERMINED THAT:

Claims 1-13 and 27-33 are cancelled.

\* \* \* \* \*